United States Patent [19]

Fahs

[11] Patent Number: 4,747,248

[45] Date of Patent: May 31, 1988

[54] CORNER CONSTRUCTION FOR EXTRUDED FRAME COMPONENTS

[75] Inventor: Robert L. Fahs, Elkhart, Ind.

[73] Assignee: Philips Industries Inc., Dayton, Ohio

[21] Appl. No.: 49,880

[22] Filed: May 14, 1987

[51] Int. Cl.$^4$ ............................................. E04C 2/38
[52] U.S. Cl. ...................................... 52/455; 52/475;
52/656; 49/504; 403/401; 403/403
[58] Field of Search .................................. 52/475–477,
52/656, 455, 456; 49/61, 504; 403/401, 403, 382

[56] References Cited

U.S. PATENT DOCUMENTS

| | | | |
|---|---|---|---|
| 1,857,093 | 5/1932 | Campbell | 52/456 |
| 1,968,890 | 8/1934 | Huff | 403/382 |
| 2,023,604 | 12/1935 | Lovejoy | 403/382 |
| 2,116,844 | 5/1938 | Overholtz | 52/656 |
| 2,601,164 | 6/1952 | Montgomery | 52/656 |
| 2,687,194 | 8/1954 | Kelly | 52/656 |
| 2,701,396 | 2/1955 | Perkins et al. | 52/455 |
| 2,706,543 | 4/1955 | Kammerer | 52/455 |
| 3,002,235 | 10/1961 | Fountain | 52/636 |
| 3,100,917 | 8/1963 | Wagner | 52/455 |
| 3,222,833 | 12/1965 | Woodrum | 403/401 |
| 3,363,922 | 1/1968 | Anderson | 52/456 |
| 4,015,382 | 4/1977 | Noyes | 49/504 |
| 4,193,238 | 3/1980 | Chalmers et al. | 52/211 |
| 4,576,502 | 3/1986 | Bancroft | 403 X/231 |

FOREIGN PATENT DOCUMENTS 394055 6/1933 United Kingdom ............... 403/401

635213 11/1978 U.S.S.R. .

Primary Examiner—James L. Ridgill, Jr.
Attorney, Agent, or Firm—Biebel, French & Nauman

[57] ABSTRACT

A corner construction, forming a connection joint, for a rectangular frame for a storm door or window formed of extruded aluminum box-like frame members. One frame member is proportioned to nest within the side walls of the other frame member, and the frame member ends are especially trimmed to form a rigid non-sagging interconnection. The wider frame member is trimmed to form a 45° wall partially extending through the frame member terminating at a straight section, while the intersecting frame member is trimmed with a V-shaped notch spaced from its butt end with one wall defining the notch proportioned to engage the 45° sloping wall of the wider member, and the butt end of the narrower frame member engaging an inside abutting connecting web of the wider frame member. Each frame member is further formed with a stepped interconnecting web which extends along the 45° abutting surfaces to provide a substantial area of contact. The sloping abutting surfaces provide the appearance of a mitered corner and provide load support across the mitered joint, while the abutting end provides for load support and attachment to the wider member. An attaching plate is employed, retained by a pair of attaching screws, to distribute thrust and load over the adjoining connecting web of the wider member.

4 Claims, 2 Drawing Sheets

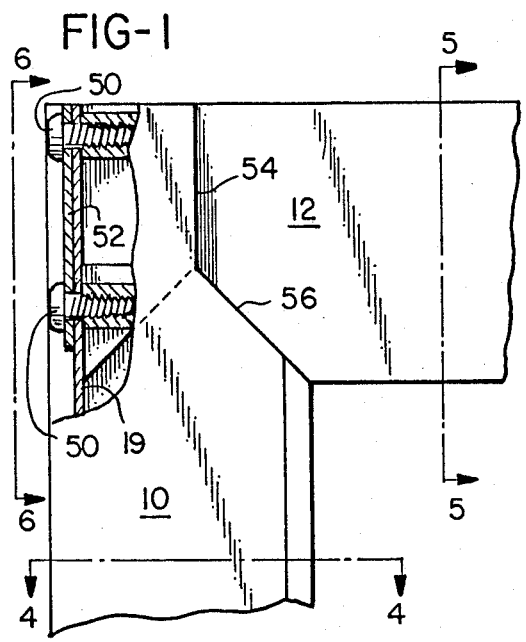
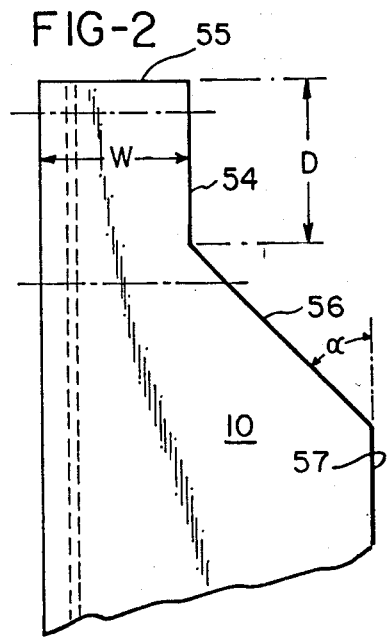
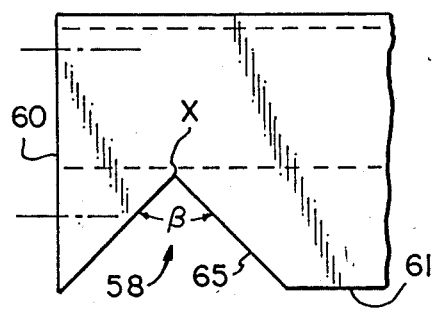
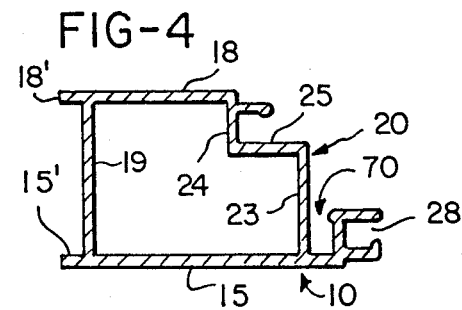
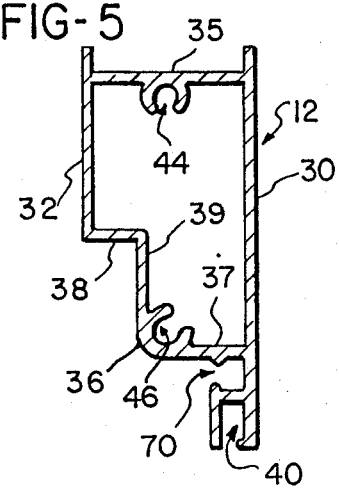
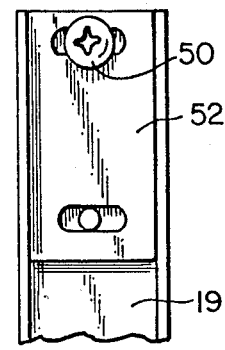

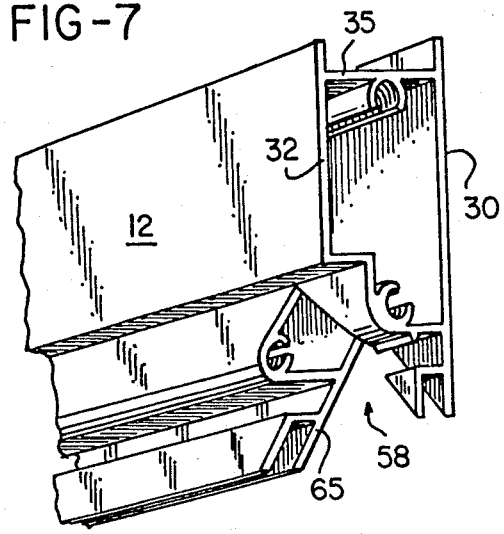
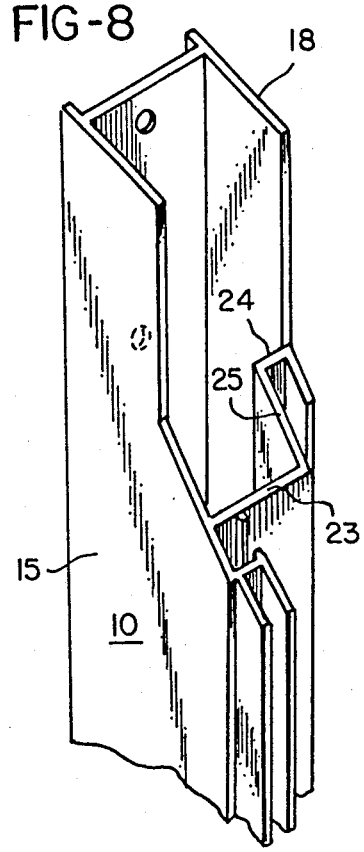
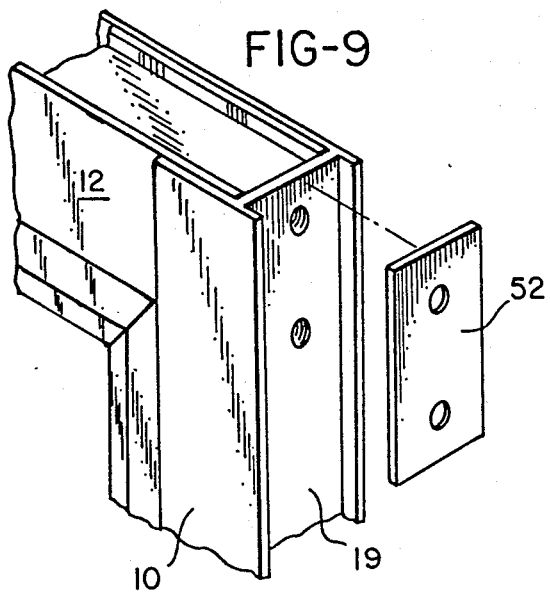

CORNER CONSTRUCTION FOR EXTRUDED FRAME COMPONENTS

BACKGROUND OF THE INVENTION

This invention relates to door frame components, and more particularly to such frame components which are formed from extruded material, such as extruded aluminum.

Extruded frame components for use in doors, such as storm doors and screen doors, are frequently formed from extruded aluminum stock, and joined together at the corners. Commonly, mitered corners are desirable by reason of an attractive appearance and their relative ease of manufacture. However, straight or simple mitered corners, in the absence of special attaching devices, do not always provide sufficient rigidity or strength so as to prevent the door from warping or sagging. The latter is a particular problem in storm doors which, during the winter months, carry glass inserts which substantially add to the weight carried by the door frame.

In the interest of reducing cost, many door frame components are made of narrower or lighter weight materials. These materials are more difficult to join together in a non-sagging form, at the corners, due at least in part to the reduction in the extent of confronting or abutting materials available to form a rigid construction. The latter is particularly true in making T-corners and simple or mitered corners.

SUMMARY OF THE INVENTION

This invention is directed to a corner construction for extruded box-like frame components, such as aluminum extrusions, used in the manufacture of storm doors, in which the frame components are joined together in a sag-resistant manner. The invention utilizes the advantages of both mitered and butt-end engagements to provide pairs of mutually confronting surfaces, and incorporates an attachment arrangement through which the confronting surfaces are urged together in an integrated and interlocking relationship.

Advantage is made of the fact that the extrusions have a wide side, such as an outside panel, and a narrower side, such as an inside panel, and the inside and outside panels are joined together by a generally stepped-shaped connecting web. The webs in the rail and stile members are essentially identically located and sized, except for the spaced-apart width of the front and back panels making up the extrusions.

One of the two intersecting members is made with its inside and outside panels or walls spaced slightly closer together than the corresponding panels or walls of the other member, to permit internesting. The frame components making up the intersecting rail and stile are especially cut to form 45° mitered abutting surfaces at the intersecting stepped-shaped webs, to provide a maximum of abutting contact, and to provide a square or end abutment between a flat end of the smaller member and a back web portion of the larger member. A coupler joins these parts together, preferably by screws extending through the back web of the outer member and into screw-receiving extrusion guides formed on the respective webs of the inner member.

The inner member is also cut to accept internesting in the outer member, by the formation of a generally V-shaped slot spaced at the abutting end to provide a 45° surface or wall which abuts directly with a corresponding 45° wall formed on the wider member, to form a rail-stile combination which has the appearance of a mitered corner, and the strength which exceeds a typical box or abutting corner, in that an abutting right-angled relationship is formed between the intersecting members as well as along a 45° diagonal. When thus joined together, the intersecting frame members exhibit a high degree of rigidity, so that the arrangement is particularly useful in restricting sag in storm doors and the like.

It is accordingly an important object of the invention is the provision of a corner arrangement for connecting interconnecting extruded frame members providing a maximum of rigidity.

A further object is the provision of door frame components, as outlined above, providing the appearance of a mitered corner, with strength which exceeds that of a box corner or a simple mitered corner.

A still further object is the provision of a frame which is relatively simple to make and assemble.

These and other objects and advantages of the invention will be apparent from the following description, the accompanying drawings and the appended claims.

BRIEF DESCRIPTION OF THE DRAWINGS

FIG. 1 is a fragmentary plan view of a door frame showing a stile or rail, joined according to this invention;

FIG. 2 is a plan view of one end of the stile;

FIG. 3 is a plan view of end of the intersecting rail;

FIG. 4 is a sectional view through the stile taken generally along the line 4—4 of FIG. 1;

FIG. 5 is a sectional view through the rail taken generally along the line 5—5 of FIG. 1;

FIG. 6 is an outside end view showing the arrangement for attaching the stile and rail looking generally along the line 6—6 of FIG. 1;

FIG. 7 is an enlarged perspective view of one end of the rail;

FIG. 8 is an enlarged perspective view of one end of the intersecting stile; and FIG. 9 is a perspective view of the assembled intersecting rail and stile.

DESCRIPTION OF THE PREFERRED EMBODIMENT

Referring to the figures of the drawing, which illustrate a preferred embodiment of the invention, a rectangular frame for a storm door or the like includes a pair of intersecting extruded aluminum frame members, including a generally vertically extending stile 10 and a horizontal rail 12. The intersecting stiles and rails of this invention, making up a door, are preferably formed of extruded aluminum material of a generally box-like hollow construction in cross-section, as shown in FIGS. 4 and 5. As outlined above, the corner or joint formed by the intersecting members 10 and 12 employs butt ends in combination with intersecting bevelled or mitered portions, preferably at a 45° angle to the longitudinal length of the members.

The members 10 and 12 are preferably of substantially identical construction, except for transverse width. Thus, the member 10, as shown in section in FIG. 4, has an outside planar panel or wall 15, and a parallel inside planar panel or wall 18. The outside wall 15 is substantially wider (measured transverse to the length) as compared to the inside wall 18. The walls are joined by an outer straight web 19, and are joined along their inside margins by a stepped inner connecting web 20. The stepped web 20 forms a closure for the open inside box-like area 21, and is formed with two transverse sections 23 and 24 joined by an intermediate inwardly extending section 25. The transverse sections 23 and 24 are of approximately equal height. An inwardly-opening kick panel retainer 28 may be formed along the inside edge of the stile 10. An opening 70 for screen retainers may also be formed.

The rail 12 is similarly formed with an outside panel wall 30 corresponding in transverse width substantially to that of the outer wall 15 of the stile. The rail similarly includes a relatively shorter inside wall 32 corresponding generally in transverse width to the corresponding width of the wall 18 of the stile 10. The spacing between the inside and outside walls is slightly less than that of the corresponding walls 15 and 18. In fact, the the difference in spaced-apart width is substantially equal to the cumulative thicknesses of the walls 15 and 18, so that the walls 30 and 32 will closely nest and fit within the walls 15 and 18.

The walls 30 and 32 are joined by a transversely-extending outer web 35 and an inner stepped web 36. The web 36, like the web 20, is formed with a pair of transverse sections 37 and 38 joined by an inwardly-extending central section 39, and extends between the respective inside edges of the outside and inside walls. Preferably, the width of the sections 37 and 38 are substantially equal, and the depth of the intermediate or inner section 39 is substantially equal to the corresponding section 25. The three sections making up the respective stepped walls can be in full abutment with each other along a mitered cut when the rails and stiles are internested. The rail 12 may also be formed with a panel-receiving lip 40 extending from the outside wall 30.

To complete the structure of the stile, a pair of integral screw-receiving retainers are formed, one retainer 44 along the inside of the outer web 35 and a second retainer 46 nested in the corner between the intersecting portions 38 and 39 of the interconnecting web 36. These screw retainers are adapted to receive retaining screws 50 extending through a common retainer plate 52, when a stile and rail are assembled, as described below in greater detail in connection with FIGS. 7, 8 and 9.

The invention includes a special technique for joining the box-like rail and stile together at a corner while simulating a mitered connection, but having the strength and rigidity of a box connection. For this purpose, the stile is formed with a cut-away portion at the end thereof, as shown in FIGS. 2 and 8. An inwardly extending cut is made along a line 54 from the butt or square end 55 of the stile 10 through the stepped web portion, leaving a width W of the outside and inside panels corresponding to the width of the outside panel 18 only and having a depth D equal to the width W. After the depth D has been reached, the cut or removed portion extends diagonally at a 45° angle (a) to the inner edge forming a tapered wall 56 through the stepped web 20. Thus, the ends of the stiles are prepared by making two simple straight cuts, a first cut to the depth D and a second diagonal 45° cut to the inside edge 57.

The rail is similarly prepared by making two simple straight cuts to form a V-shaped notch 58. From a point adjacent the butt end 60, a first 45° cut is made from the inside edge 61 to a depth corresponding to the difference between the width of the inner narrow wall 32 and the outer wider wall 30, to an apex point X. A second intersecting cut is also made at 45° to the longitudinal direction or 90° (b) to the first cut back to the inside edge 61. The point X is at a depth such that, in the portion removed from the rail, the stepped portion of the web is exposed fully along the wall 65, as shown in FIG. 7. When the terminal end 60 of the rail 12 is inserted between the walls of the stile and nested, as shown in FIG. 1, the 45° inclined walls 65 and 56 come into full abutment with each other just as the butt end 60 of the rail comes into contact with the inside surface of the web 19. The assembled appearance is that as shown in FIGS. 1 and 9 with the now joined walls defined by the stepped webs forming a 45° diagonal, and having the appearance of a mitered joint.

By forming the V-shaped notch 58 in the rail, a terminal butt end 60 is retained on the rail having the original full dimensions of the rail for butting against the opposed inside surface of the web 19, forming a substantial butt area joint. At the same time, the inclined surfaces along the lines 56 and 65 are in full alignment with each other. This aligned positioned is retained by the retainer screws 50 which extend from a point outwardly of the web 19 through a pair of access openings in the web into the screw retainers, and retain and capture the retention plate 52 thereunder. The retention plate 52 distributes the load from the screws, prevents the screw heads from otherwise pulling through the web 19, and spreads the load along the outside surface of the web 19 of the stile 10. When these screws are tightened, the relative abutting surfaces, including the inclined, as well as the butt end surfaces, are in full engagement with each other.

Each of the opposite ends of the rails and stiles are prepared as described. Accordingly, each of the four joints making up a storm door or the like is assembled into a rigid frame relation which resists sag, when weighted down with glass, and particularly resist sagging of a door when supported only by hinges along the stile. Particularly, the butt end 60, which presents the full area of the end of the rail 12 particularly between the encapturing side walls of the stile 10, serves to prevent torsional twisting movement between the connected and joined intersecting frame members. The mutual engagement of the frame members along the diagonal sloping walls 56 65 prevents folding or buckling of one of the frame members with respect to the other. The retainer plate 52 when mounted on the outer surface of the web 19, is captured between the rearward extension of the side walls and is retained in place by the extending edges 15' and 18' of the side walls, and accordingly is held in its relative position on the frame even if the screws 50 become loosened.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a rectangular frame for a storm door or the like, in which extruded aluminum frame members forming the rails and stiles of the rectangular frame are joined together at the corners, the improvement comprising:

a first hollow box-like extruded frame member and having a generally planar front side wall and a parallel generally spaced-apart planar back side wall, and and inner and outer side wall connecting webs extending between said front and back side walls, a second hollow box-like extruded frame member also having generally planar and parallel spaced-apart front and back side walls, which walls have substantially the same dimensions in width as the corresponding said side walls of said first member, said second frame member also having inside and outside connecting webs extending between said front and back side walls, the spacing between the front and back side walls of said first member being greater than the spaced-apart distances of the corresponding said side walls of said second member permitting said second member side walls to be telescoped in closely fitted relation to the inside surfaces of the corresponding walls of said first member, the opposite ends of each of said first members having a transverse inner portion of side walls thereof trimmed off along a longitudinal length approximately equal to the transverse width of said back side wall, said trimmed portion terminating at a sloping wall leading to the inside edges thereof at an angle of generally 45°, said second members at each end thereof having formed therein a generally V-shaped notch extending inwardly from the inner side thereof and defining an included angle of about 90° extending 45° either side of a transverse line normal to the longitudinal length of said second member, and one side wall of said notch terminating at the butt end of said second member and extending a depth corresponding to the depth of said trimmed portion of said first member, with said butt terminal end adapted to seat against the inside surface of the outside connecting web of said first member and with one side of said notch seated against said sloping wall, and means retaining said frame members in said abutting seated relation.

2. A frame for a door in which intersecting hollow aluminum frame members are joined at mitered corners, the improvement comprising:

a first hollow frame having an outside generally flat panel member, an inside generally flat panel member having a width substantially less than said outside panel member, connecting webs joining said panel members generally along the transverse outer and inner edges thereof in fixed spaced-apart relation to each other, a second frame also having outside and inside panel members having transverse dimensions substantially the same as the corresponding members of said first frame member, connecting webs joining said panel members in spaced-apart relation along the transverse outer and inner edges thereof, the spacing of the panel members of said second frame being less than that of said first frame, permitting the panel members of said second frame to internest within the corresponding panel members of said first frame, an end of said first frame being partially transversely cut away to form an extending portion thereof joined to the remaining portion of said first frame along a 45° sloping wall, each of said second frames having a butt end and transverse notch cut therein defining a 45° sloping surface spaced from said butt end and positioned to engage said sloping wall when said frames are internested at 90° to each other and said butt end of said second ram engages the inside surface of one of the connecting webs of said first frame.

3. In a rectangular frame for a storm door or the like, in which extruded aluminum frame members forming the rails and stiles of the rectangular frame are joined together at the corners, the improvement comprising:

a first hollow box-like extruded frame member having a generally planar front side wall and a parallel generally spaced-apart planar back side wall, the front side wall being wider than the back side wall, an outer side wall connecting web extending between said front and back side walls at the outside margins thereof, an inner side wall connecting web having a stepped configuration extending generally between the inside edge of the front to the inside edge of said back side wall, a second hollow box-like extruded frame member also having generally planar and parallel spaced-apart front and back side walls, which walls have substantially the same dimensions in width as the corresponding said side walls of said first member, said second frame member also having an outside connecting web extending between the front and back side walls thereof at the outside margins thereof, and also having a correspondingly stepped inside connecting web extending between said front and back side walls at the respective inside margins thereof, the spacing between the front and back side walls of said first member being greater than the spaced-apart distances of the corresponding said side walls of said second member permitting said second member side walls to be telescoped in closely fitted relation to the inside surfaces of the corresponding walls of said first member, the opposite ends of each of said first members having a transverse inner portion of side walls thereof trimmed off along a longitudinal length approximately equal to the transverse width of said back side wall, said trimmed portion terminating at a sloping wall leading to the inside edges thereof at an angle of generally 45°, said second members at each end thereof having formed therein a generally V-shaped notch extending inwardly from the inside web thereof and defining an included angle of about 90° extending 45° either side of a transverse line normal to the longitudinal length of said second member, one side wall of each said notch terminating at the butt end of said second member and extending a depth corresponding to the depth of said trimmed portion of said first member, with said butt terminal end adapted to seat against the inside surface of the outer connecting web of said first member and with one side of said notch seated against said sloping wall, and means retaining said frame members in said seated relation.

4. A frame for a door in which intersecting hollow aluminum frame members are joined at mitered corners, the improvement comprising:

a first hollow frame having an outside generally flat panel member, an inside generally flat panel member having a width substantially less than said outside panel member, a connecting web joining said panel members generally along the transverse outer edges thereof in fixed spaced-apart relation to each other, and a stepped-shaped web joining the respective transverse inner edges of said panel members a second frame also having outside and inside panel members having transverse dimensions substantially the same as the corresponding members of said first frame member, a connecting web joining said panel members in spaced-apart relation along the transverse outer edges thereof, said second frame also having a stepped-shaped web joining the respective transverse inner edges of said panel members, said stepped-shaped web being substantially identical to the corresponding web of said first frame to present mutually abutting edges when joined together, the spacing of the panel members of said second frame being less than that of said first frame, permitting the panel members of said second frame to internest within the corresponding panel members of said first frame, each end of said first frame being partially cut away to form an extending portion thereof consisting principally of said inside panel member and a corresponding portion of said outside panel member and being joined to the remaining portion of said first frame along a diagonal sloping wall through said stepped-shaped web, with the longitudinal length of said extended end portion being substantially equal to the width of said inside panel member, each end of said second frame member having a transverse V-shaped notch cut therein through the associated stepped-shaped web with the apex of said notch terminating substantially at the junction of said inside panel thereof with said stepped-shaped web, and said apex spaced from the end of said second frame a distance substantially equal to the spacing between the connecting web of said first frame and the junction between said extending portion and said sloping wall, so that when said frame ends are internested at 90° to each other, the terminal butt end of said second frame engages the inside surface of the connecting web of said first frame, and the respective stepped-shaped webs abut each other along a diagonal mitered corner.

* * * * *